United States Patent

Wieland et al.

[11] Patent Number: 6,155,758
[45] Date of Patent: Dec. 5, 2000

[54] HEXAPODAL MACHINING CENTER

[75] Inventors: Frank Wieland, Chemnitz; Michael Schwaar, Hartmannsdorf; Reimund Neugebauer, Dresden, all of Germany

[73] Assignee: Fraunhofer-Gesellschaft zur Förderung der angewandten Forschung e.V., Munich, Germany

[21] Appl. No.: 09/261,523

[22] Filed: Mar. 3, 1999

Related U.S. Application Data

[63] Continuation of application No. PCT/EP97/03861, Jul. 18, 1997.

[30] Foreign Application Priority Data

Sep. 5, 1996 [DE] Germany .................. 196 36 100

[51] Int. Cl.[7] .................. B23C 1/06; B25J 1/02
[52] U.S. Cl. .............. 409/201; 74/490.03; 409/216; 409/235; 901/22; 901/23; 901/41
[58] Field of Search ................ 409/235, 201, 409/211, 216; 408/236, 234; 414/917; 74/490.06; 901/22, 28, 29, 23, 24, 41

[56] References Cited

U.S. PATENT DOCUMENTS

| | | | |
|---|---|---|---|
| 5,354,158 | 10/1994 | Sheldon et al. ................ | 409/201 |
| 5,401,128 | 3/1995 | Lindem et al. ................ | 409/132 |
| 5,787,758 | 8/1998 | Sheldon ................ | 901/22 X |
| 5,832,783 | 11/1998 | Sheldon ................ | 409/235 X |
| 5,906,461 | 5/1999 | Lunz et al. ................ | 409/201 |

FOREIGN PATENT DOCUMENTS 0 674 696 A1  10/1995  European Pat. Off. .

OTHER PUBLICATIONS

5 Dof Robots Internet Site at sop.invla.fr/saga/personnel/morlet/Archi/nodez.

Primary Examiner—William Briggs
Attorney, Agent, or Firm—Akin, Gump, Strauss, Hauer & Feld, L.L.P.

[57] ABSTRACT

In known hexapodal machining centers, a movable support is supported and the individual struts are articulated on the support in one plane. For permitting a greater movability of the support, especially in the rotational degrees of freedom, and for improving the absorption of the forces, a hexapodal machining center having a stationary frame and a movable support is provided, in the case of which the six connecting struts of adjustable length are articulated on the support. Three articulation points respectively define a common plane of application so that two separate planes are defined. Also, the articulation of the struts on the frame is effected in two separate planes of application.

18 Claims, 14 Drawing Sheets

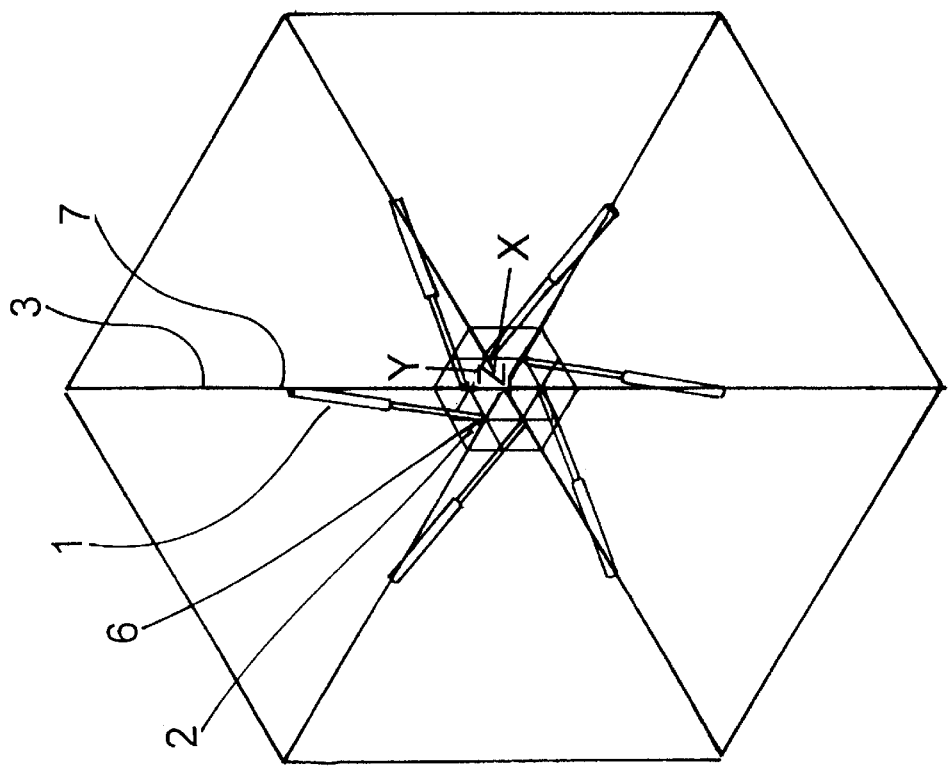
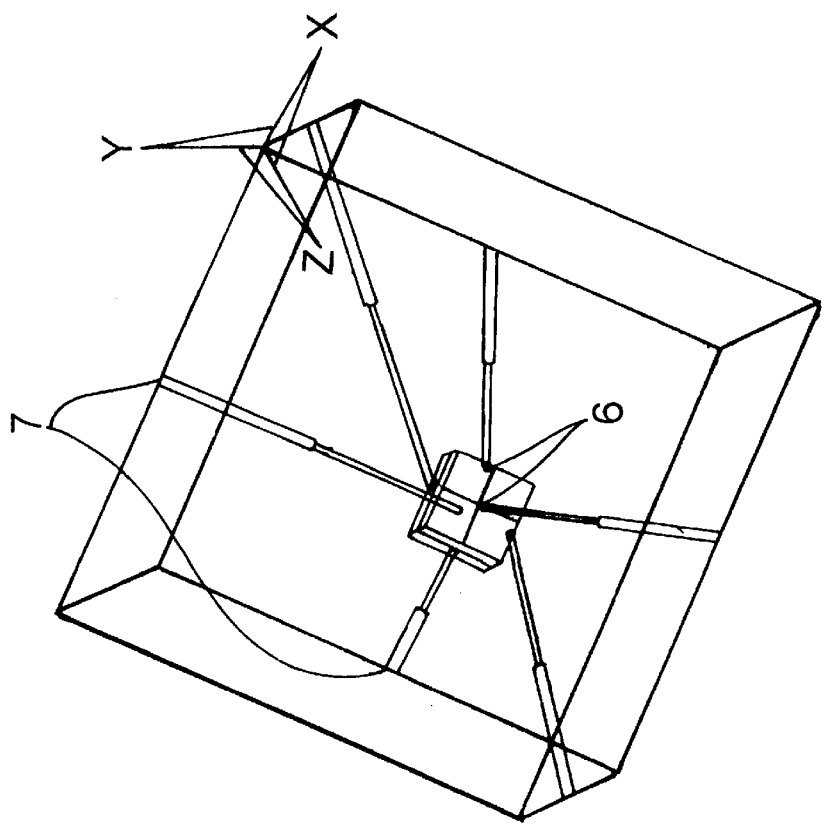
Fig. 2b
Fig. 2a

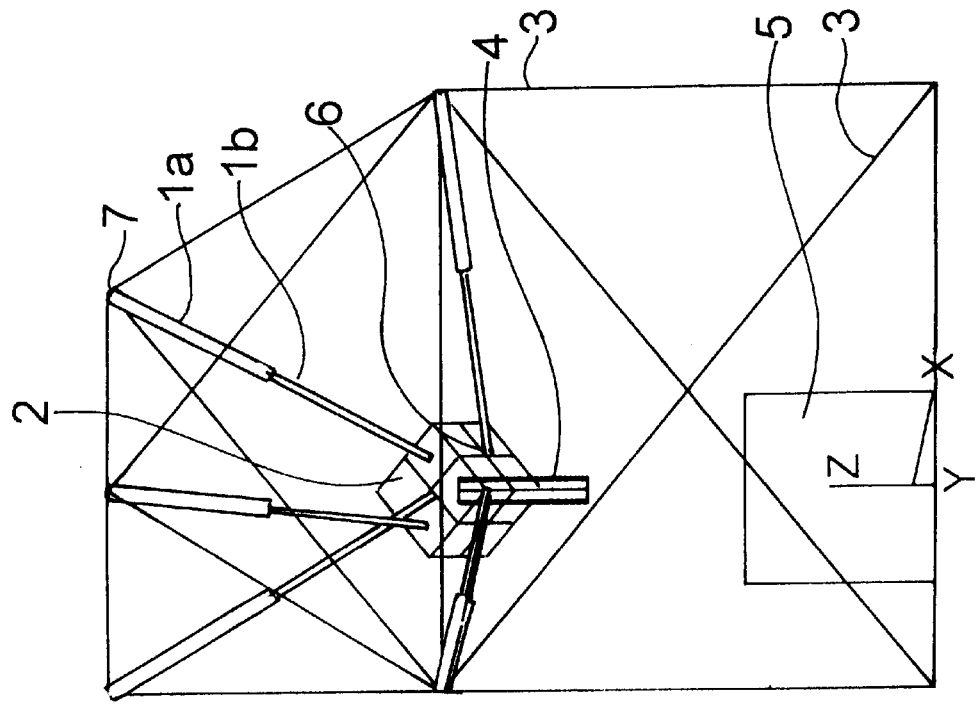
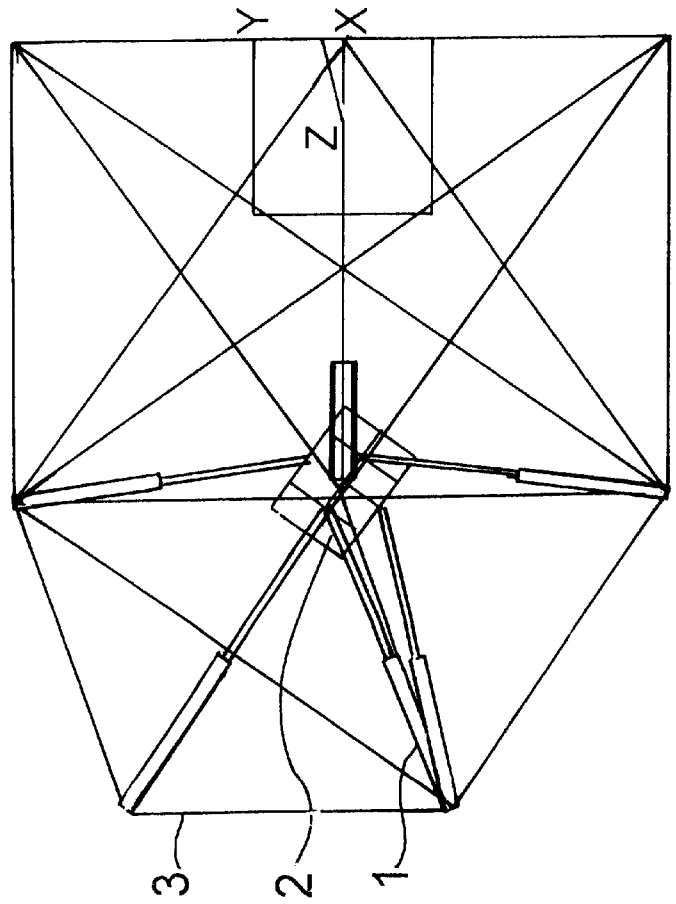

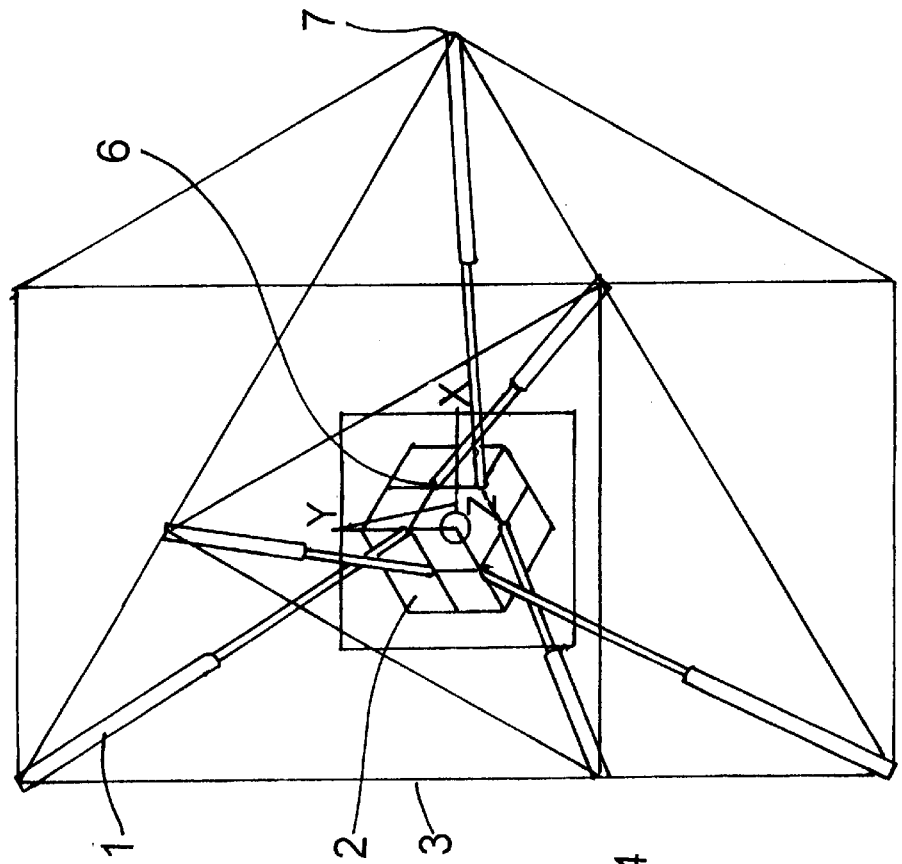
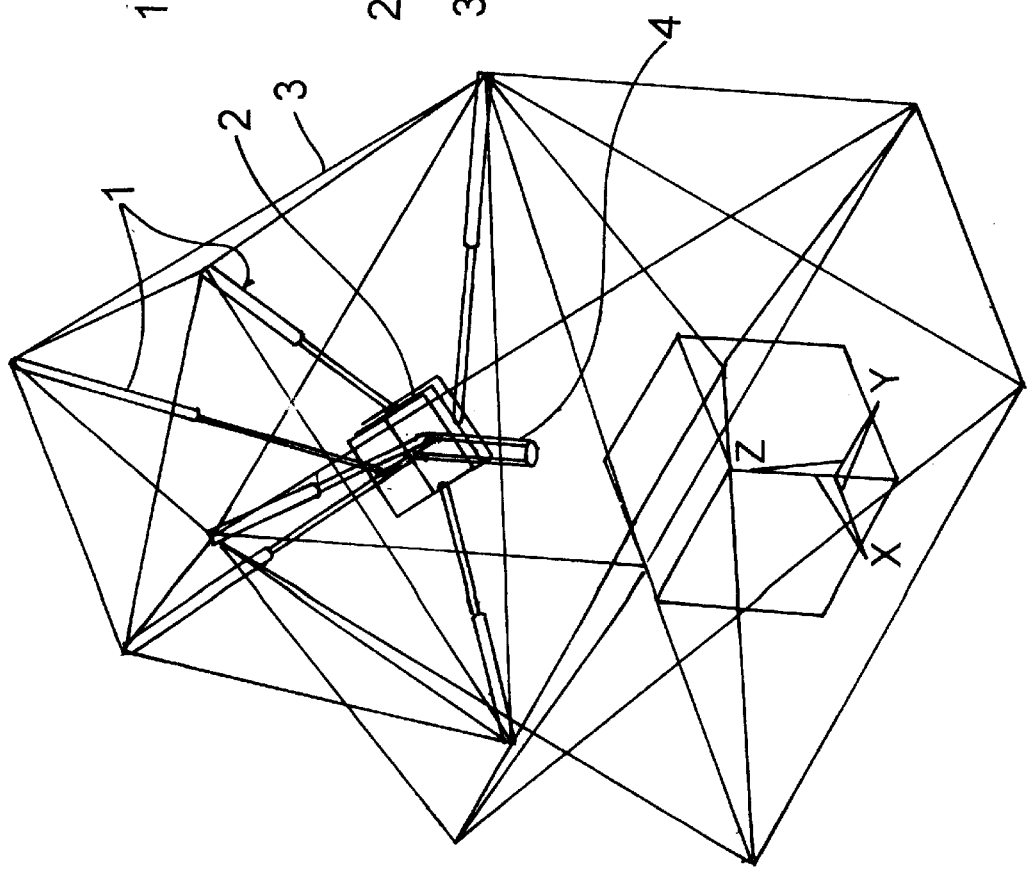
Fig. 4a
Fig. 4b

HEXAPODAL MACHINING CENTER

CROSS REFERENCE TO RELATED APPLICATION

This application is a continuation of International Application PCT/EP97/03861, filed Jul. 18, 1997, the disclosure of which is incorporated herein by reference.

BACKGROUND OF THE INVENTION

The present invention refers to the field of hexapodal machining centers comprising a stationary frame and a support, which are interconnected by six struts of adjustable length. In particular, the present invention refers to such a hexapodal machining center in which the support has provided thereon six separate articulation points for the struts.

Such hexapodal machining centers are used as machine tool structures. They are particularly suitable for machines used for metal-cutting operations, such as milling, drilling, turning or grinding or for laser machining. Such machine structures can also be used for coordinate measuring machines and in the field of manipulation technology.

Hexapodal machining centers consist, in principle, of a support, which is also referred to as a working platform in some cases, and of a stationary frame, said support and said frame being interconnected by six struts of adjustable length. This permits a movement of the working platform in all six spatial degrees of freedom, i.e. three translatory degrees of freedom and three rotational degrees of freedom.

A first hexapodal machining center is known from U.S. Pat. No. 5,401,128. This known machine tool structure consists of an octahedral machine frame comprising twelve rigid braces. At the center of the machine frame, a machining unit is arranged, which is provided with a spindle. In addition, a stationary work piece reception device is arranged in the lower part of the octahedral machine frame. Above the work piece reception device, the hexapod, i.e., a support and working platform for the machining unit, is arranged, said machining unit being e.g., a drilling spindle or a cutter spindle. Two respective hexapod struts of adjustable length have one of their ends articulated on one corner of a triangular upper frame member of the machine frame, the articulation points of the two struts on the machine frame being arranged at only a small vertical distance from one another. The articulation points of the six struts on the working platform are all positioned in one common plane. This arrangement entails a limitation of the rotational movements. In addition, the forces are not absorbed in the struts in an optimum manner, since said struts do not extend in the main load directions.

A further hexapodal machining center is known from U.S. Pat. No. 5,354,158. In the case of the hexapod shown there, two neighboring struts are articulated on a corner of an imaginary triangle on the working platform, and two other neighboring struts are articulated on the corner of a further imaginary triangle on the frame, the two triangles, which are arranged in parallel, being rotationally displaced relative to one another. The respective articulation points of the struts on the working platform and on the frame are articulated in a common plane. In addition, U.S. Pat. No. 5,354,158 discloses the measure of arranging the articulation points on the frame in two spaced planes. As far as the movability of the working platform and the absorption of the forces is concerned, this arrangement shows similar disadvantages as the arrangement according to U.S. Pat. No. 5,401,128.

SUMMARY OF THE INVENTION

It is therefore an object of the present invention to improve in a hexapodal machining center of the type mentioned at the start the movability of the support in all six degrees of freedom, and especially in the three rotational degrees of freedom, and to optimize the absorption of forces. This object is achieved by a hexapodal machining center, wherein three articulation points of three struts on the support define a first plane of application, and three articulation points of three further struts on the support define a further separate plane of application, the two planes of application being spaced from one another. The articulation points of the three struts of the first plane of application on the support define a plane of application on the frame, and the articulation points of the three struts of the further plane of application on the support define a further separate plane of application on the frame. The first plane of application on the frame lies on that side with respect to the further plane of application on the frame, as the first plane of application on the support lies with respect to the further plane of application on the support.

This has the effect that a greater freedom of movement of the working platform is achieved, since the joints of the struts on the articulation points on the support do not obstruct one another. In particular, a greater freedom of movement in the rotational degrees of freedom is achieved in this way. Hence, the hexapodal machining center can also be used for more compact supports and smaller machines. The fact that the articulation points on the carrier are spaced apart will also improve the stability of the support and will therefore permit an increased manufacturing accuracy that can be achieved by the machining center.

The support can have attached thereto a machining unit and/or a sensor means for position detection. The machining unit can carry a spindle, a desired position in space of said spindle being provided, e.g., horizontal or vertical, according to requirements. The structural design of the frame is adapted in a suitable manner for this purpose.

According to a preferred embodiment of the present invention, the struts are suspended in the frame in such a way that the articulation points of three respective struts on the frame define a total of two separate planes of application. This arrangement of the struts contributes to a higher movability, especially as far as the rotational degrees of freedom are concerned, and to a more uniform absorption of forces. In addition, this permits an arrangement in which the construction space available is utilized in a particularly efficient manner, since, due to the distribution of the articulation points on the support and on the frame, more space will be available for designing the respective joints in the articulation points. This will increase the freedom of structural design and permit a more compact mode of construction.

Preferably, the articulation points of the struts on the working platform are arranged on an imaginary polyhedron, e.g., a cube or a rectangular parallelepiped, or also on an imaginary sphere. This has the effect that the load will be distributed more uniformly over the individual struts and that the individual struts will neither obstruct one another in space nor restrict the movability of the support. The support itself can have an arbitrary shape and may, for example, also be implemented as a substantially cylindrical body carrying the machining unit, the articulation points of the individual struts corresponding to the articulation points on the imaginary polyhedron or the imaginary sphere. For making the application of force more uniform, each of the six faces of an imaginary cube has provided thereon an articulation point. When the articulation points are arranged at the face center of the respective face of the imaginary cube, the application of force will be rendered particularly uniform.

Preferably, the articulation points of the struts on the frame are arranged on a respective outer edge of an imaginary three-dimensional polyhedron, e.g., a cube or a rectangular parallelepiped. This has the effect that the introduction of forces into the frame is rendered more uniform. The frame itself need not necessarily have the shape of a cube or of a sphere, but it can have an arbitrary machine structure, e.g., a framework structure. The essential point is that the articulation points remain at the respective positions relative to one another. Preferably, opposed surfaces on the support are connected via a respective strut to parallel outer edges of the frame. The outer edges of an imaginary frame cube or rectangular parallelepiped can be neighboring edges or opposed edges.

By means of a symmetrical arrangement of two opposed struts with regard to their suspension in the frame and their articulation on the support, the investment in control technology required for carrying out movements of the support can be reduced.

According to a further development of the present invention, the support is provided with a main spindle extending along a main diagonal of said support, e.g., through opposed corners of an imaginary cube. Since three faces meet at one corner of a cube or of a rectangular parallelepiped, the orientation of the spindle along a main diagonal permits a tripod support on these three faces and, consequently, an optimum absorption of forces and movability of the support. Due to the additional support on the three remaining faces of the cube or of the rectangular parallelepiped, the position of the spindle axis will be stabilized.

Preferably, the spindle of the support is, at a position of rest, orientated parallel to an axis in space of the work piece coordinate system. This permits a simplification of the transformations of the coordinates upon determining the strut movements required for moving the support, the length of said struts being adjustable in a controlled manner.

Further advantageous embodiments of the present invention are described below and set forth in dependent claims.

BRIEF DESCRIPTION OF THE SEVERAL VIEW OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIGS. 1(a) to (d) show a schematic representation of a first embodiment of the support of the working platform in a hexapodal machining center, in a three-dimensional view (a), a bottom view (b), a front view (c) and a side view (d);

FIGS. 2(a) to (d) show a schematic representation of a second embodiment of the suspension of the working platform of a hexapodal machining center, in a three-dimensional view (a), a bottom view (b), a front view (c) and a side view (d);

FIGS. 3(a) to (d) show a hexapodal machining center in the form of a machine tool having a triangular base area, in a three-dimensional view (a), a top view (b), a side view (c), and a front view (d);

FIGS. 4(a) to (d) show a hexapodal machining center in the form of a machine tool having a rectangular base area, in a three-dimensional view (a), a top view (b), a side view (c), and a front view (d);

FIGS. 5(a) to (d) show the framework structure of the frame of a machine tool according to FIG. 3, in a three dimensional view (a), a top view (b), a side view (c), and a front view (d);

FIGS. 6(a) to (d) show a machine tool according to FIG. 3 having a substantially cylindrical working platform, in a three-dimensional view (a), a top view (b), a side view (c), and a front view (d); and FIGS. 7(a) to (d) show a machine tool according to FIG. 4 having a substantially cylindrical working platform, in a three-dimensional view (a), a top view (b), a side view (c), and a front view (d).

DETAILED DESCRIPTION OF THE INVENTION

Figure 1B:
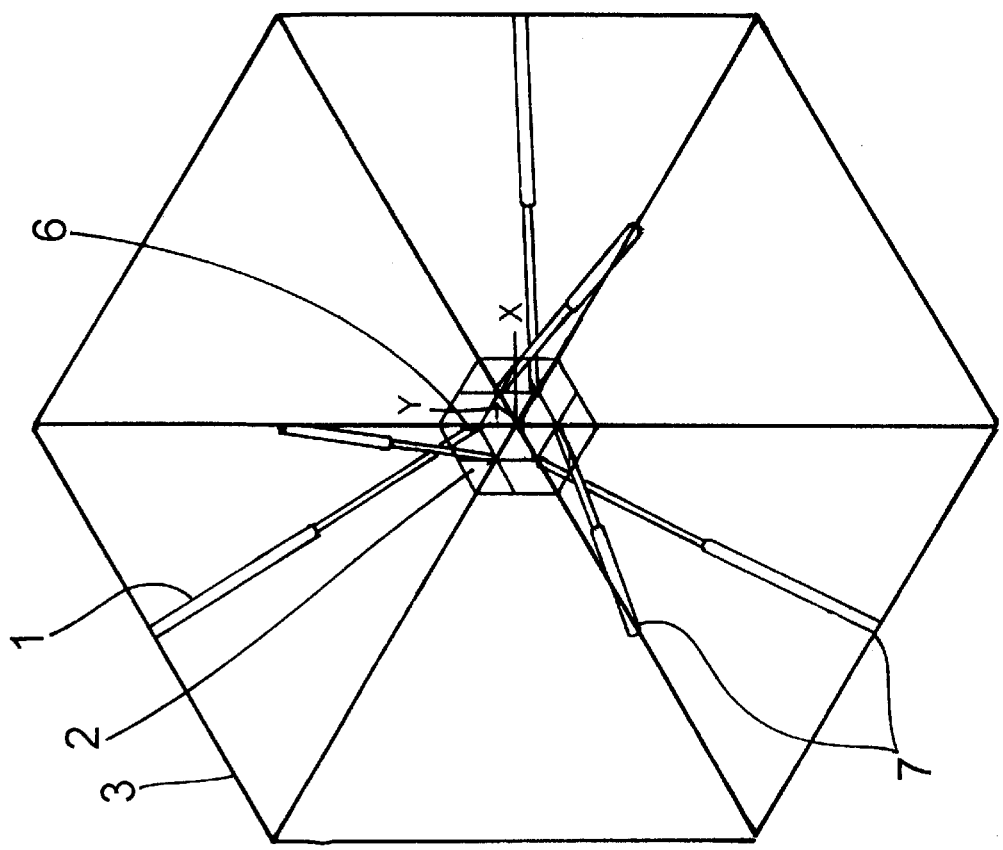
Figure 1A:
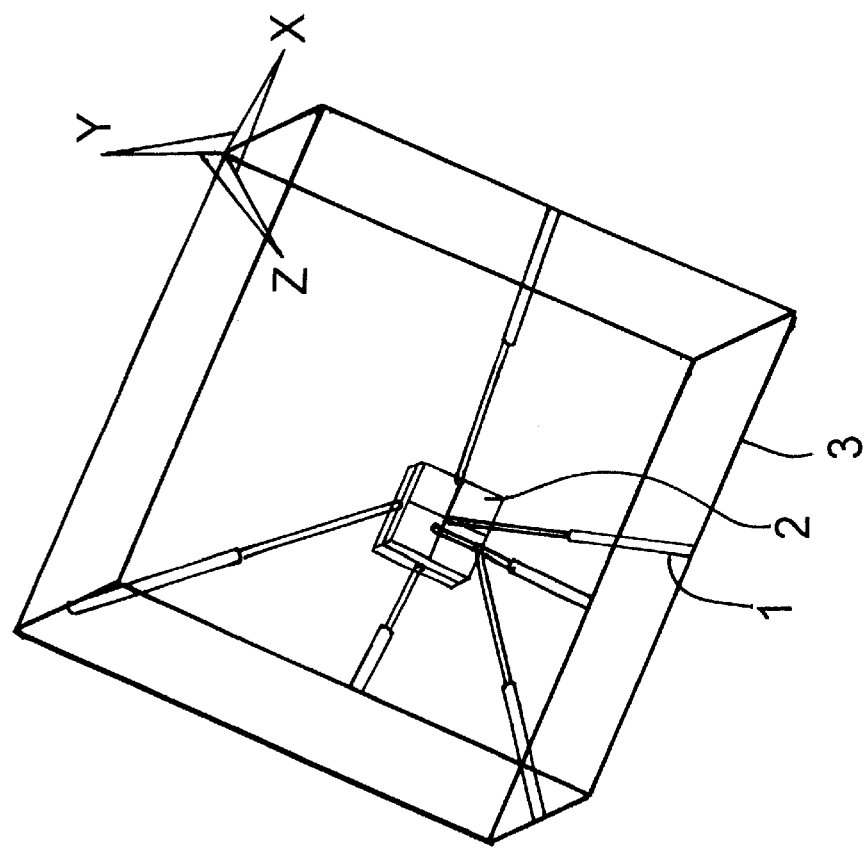
Figure 1D:
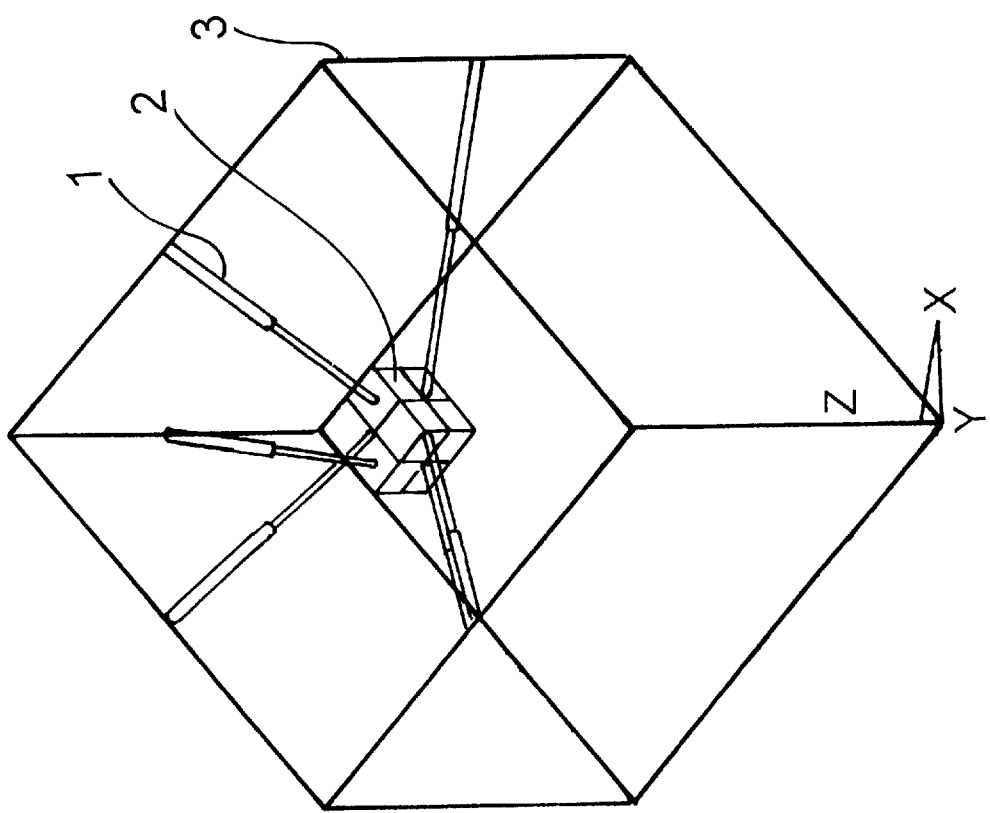
Figure 1C:
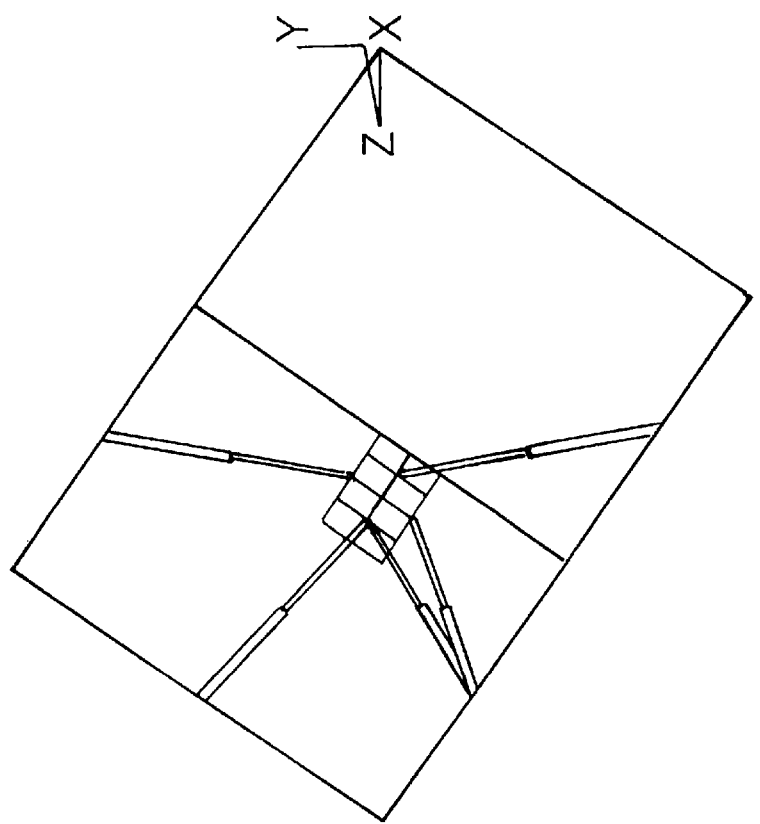
Figure 2D:
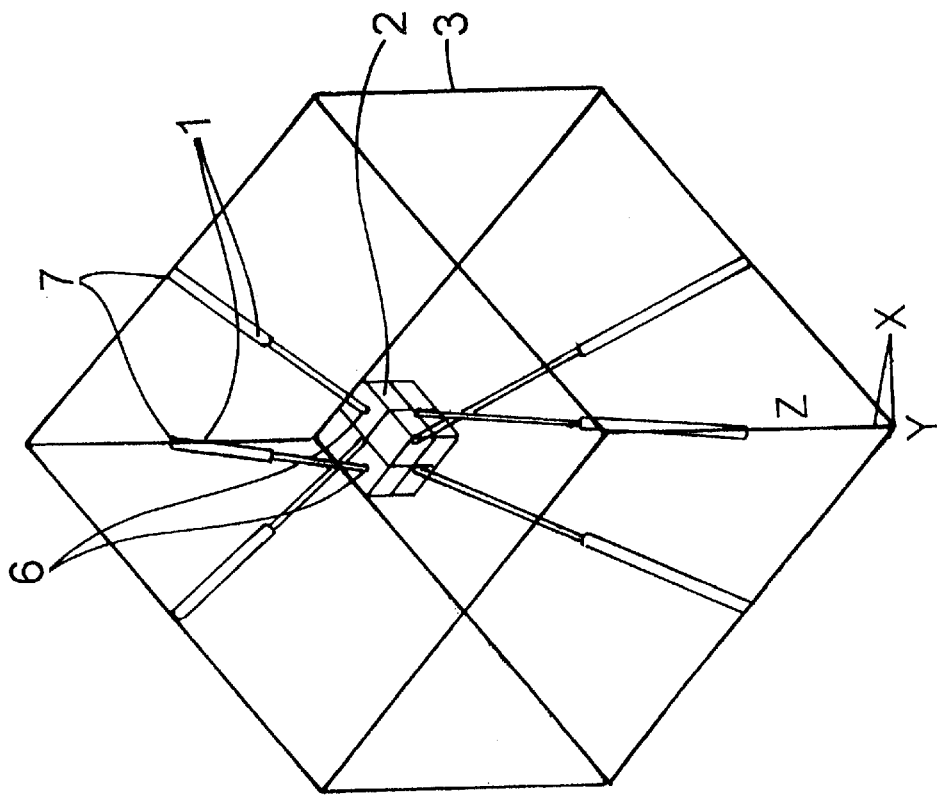
Figure 2C:
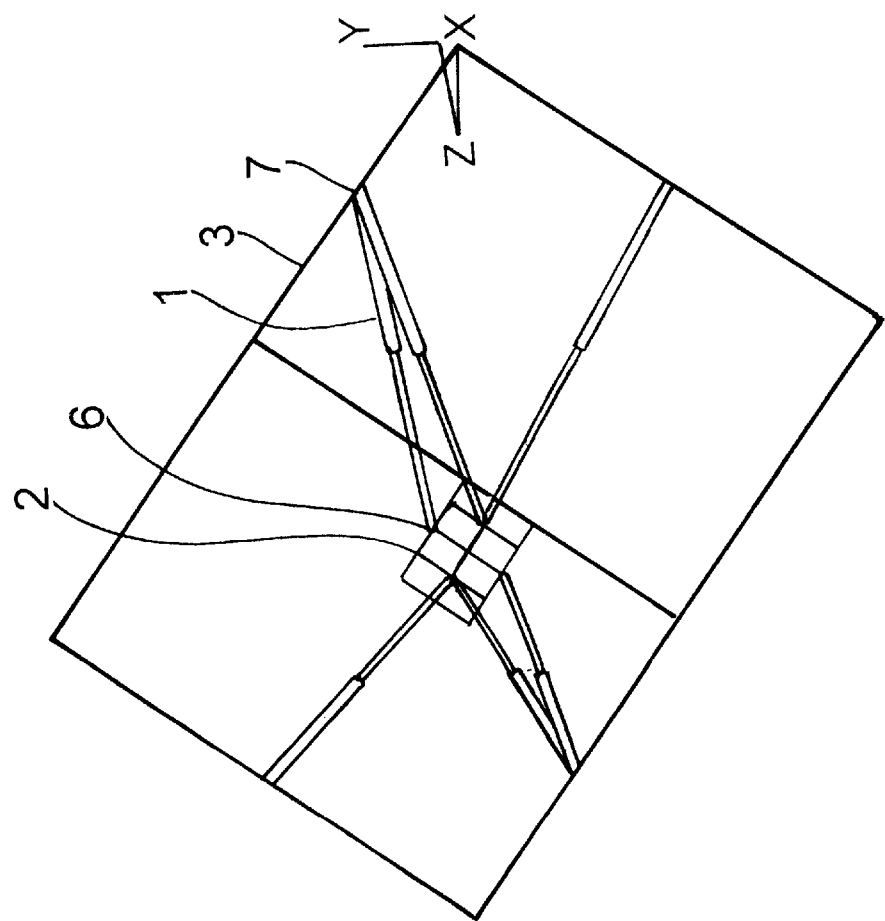

In the following, it will first be described on the basis of FIGS. 1 and 2 how the support 2 is suspended from the frame 3; this kind of suspension can be realized in the case of the machine tools shown in FIGS. 3 to 7.

The support 2, which is implemented as a working platform in the embodiments, is suspended from the frame 3 via six struts 1. The individual struts consist of a stationary and of an extensible part. They can be implemented as hydraulic or pneumatic cylinders or as a recirculating ball screw and nut. In the embodiment shown, the respective extensible part is articulated on the working platform. For illustrating the spatial position of the articulation points, the working platform 2 is shown in the form of a cube in FIG. 1, said cube being, in turn, suspended in a cubic frame 3. The concrete structural design of the working platform and of the frame is, however, not limited to strictly geometrical three-dimensional configurations, such as cubes or rectangular parallelepipeds.

As can be seen from FIG. 1, three articulation points of the struts on the working platform 2 respectively define a common plane of application so that a total of two separate planes of application is defined. In the case shown, the working platform 2 is articulated via the six face centers of the imaginary cube. This results in the formation of spaced articulation planes on the working platform, each of said articulation planes being formed by three articulation points. When the axis of the main spindle is arranged at right angles to the two planes, this will result in a particular good stabilization of the spindle axis.

Opposed face centers of the imaginary cube are connected to parallel outer edges of the imaginary cube of the frame 3 by means of the struts. In the concrete embodiment according to FIG. 1, these outer edges are neighboring outer edges of the imaginary frame cube. The embodiment shown in FIG. 2 differs from that shown in FIG. 1 only insofar as opposed struts are articulated on the frame cube on opposed outer edges of said frame cube. In both cases, three respective articulation points on the frame define a common plane of application so that a total of two separate planes of application is defined.

On the basis of this arrangement of the articulation points, the calculation work required for controlling the movement of the individual struts during a movement of the working platform can be reduced for respective opposed struts 1. In addition, this arrangement permits a uniform absorption of forces. Since, due to the arrangement of the articulation points on the working platform 2, the struts 1 produce a supporting effect in the direction of the main load, the hexapodal machining center has a particularly high structural stiffness so that high manufacturing accuracies can be achieved and the individual struts can be provided with more compact dimensions.

Since the scope of the structural design possibilities is increased on the basis of the articulation of the struts on the working platform in several planes of application, a more compact structural design of the working platform as well as a greater movability, especially in the rotational degrees of freedom, can be achieved. The individual suspension modes of pairs of struts on neighboring or opposed outer edges of the imaginary frame cube can also be combined with one another.

The articulation of the struts 1 is effected via joints, such as spherical joints or Cardan joints.

Figure 3B:
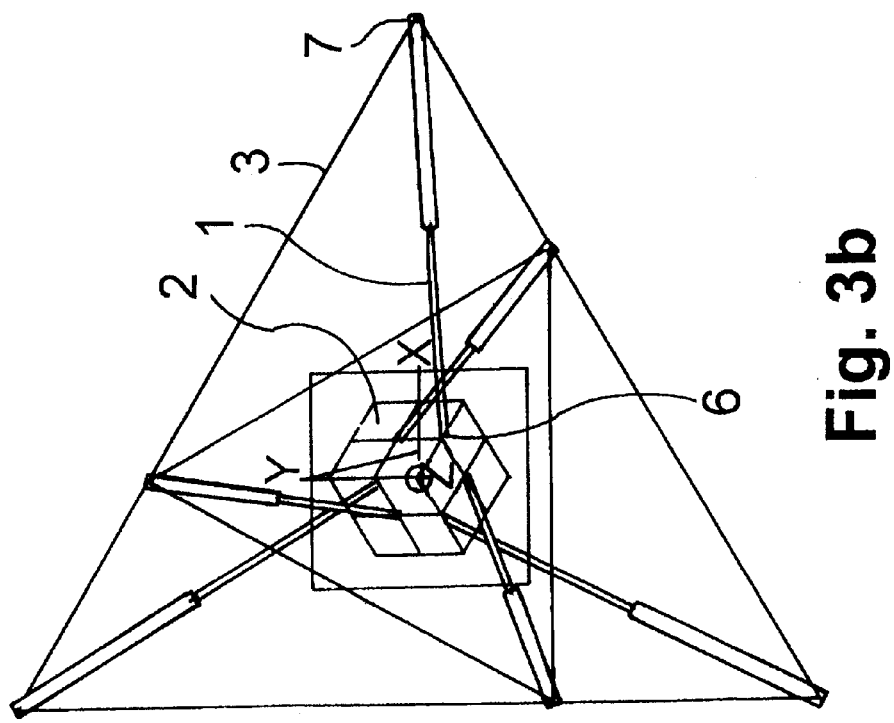
Figure 3A:
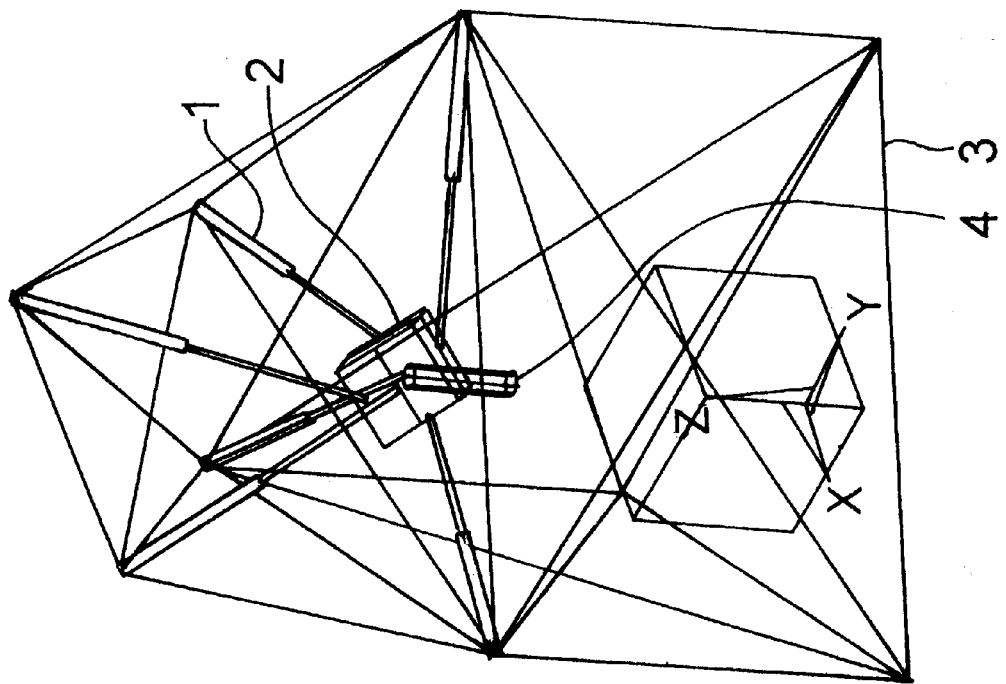

In FIG. 3, a hexapodal machining center is shown in the form of a machine tool. The frame 3 is implemented in the form of a framework structure and has a triangular base area. The frame 3 has provided thereon a stationary tool table 5. In the embodiment shown, the working platform 2 has provided thereon a main spindle 4 arranged above the tool table 5 and oriented in the vertical direction. The main spindle extends in the direction of a diagonal of the imaginary cube of the working platform. On the basis of a suitable adaptation of the frame, the main spindle can be oriented in any direction in space while maintaining the supporting geometry of the working platform 2.

Figure 4D:
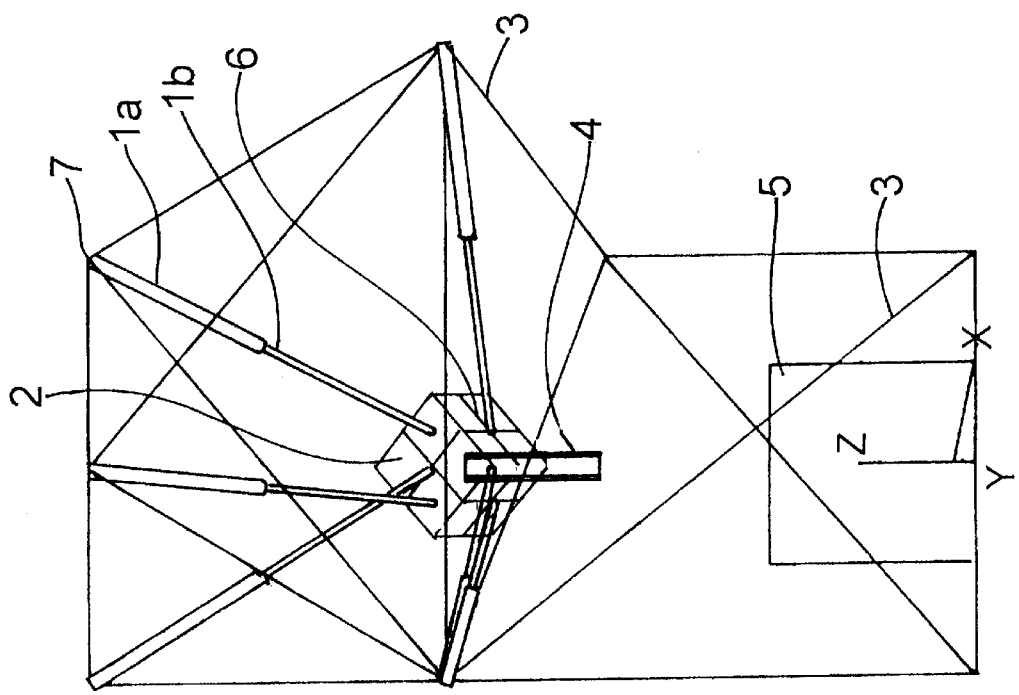
Figure 4C:
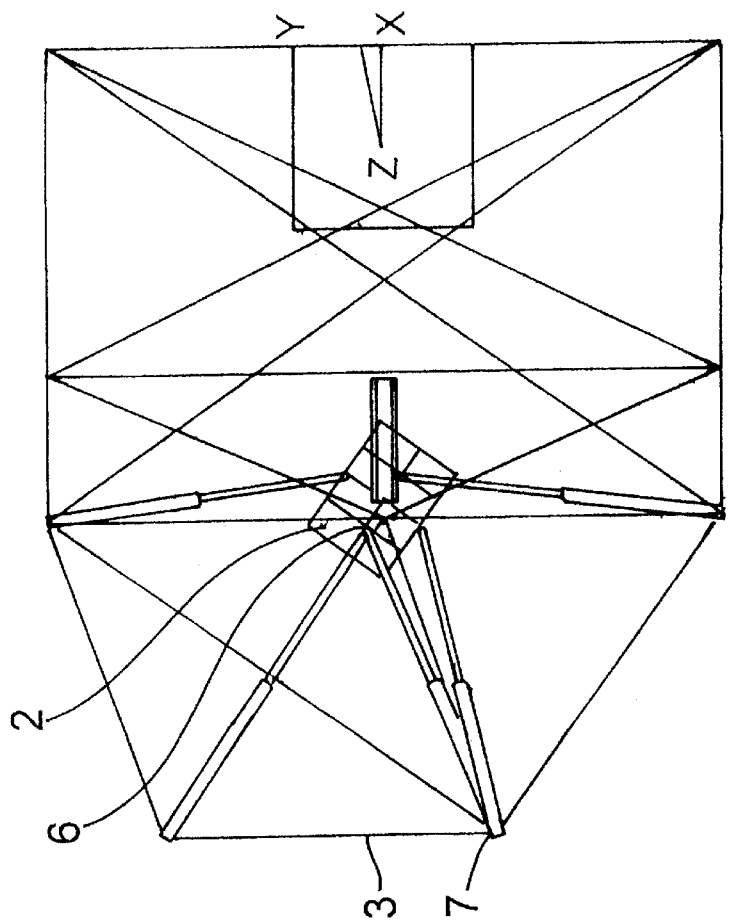
Figure 5B:
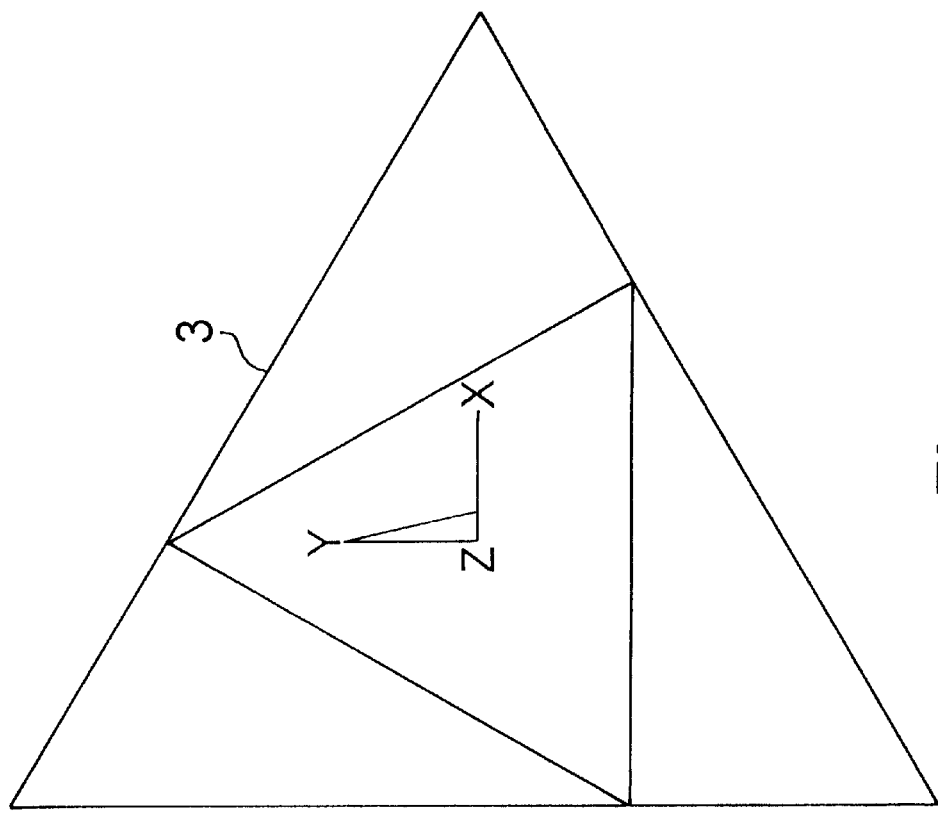
Figure 5A:
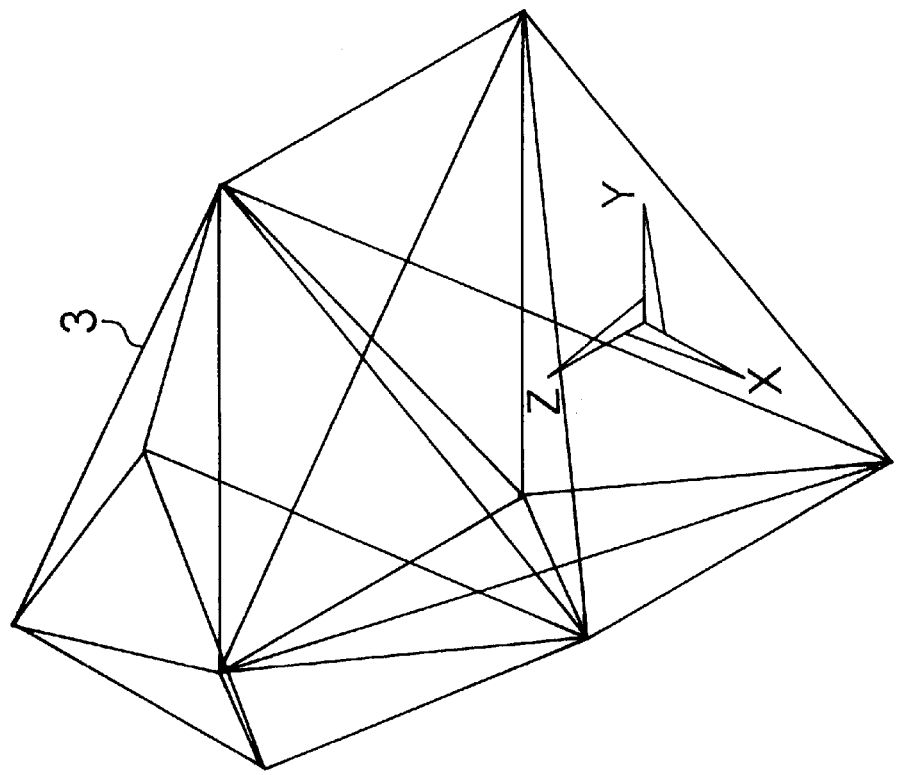
Figure 5D:
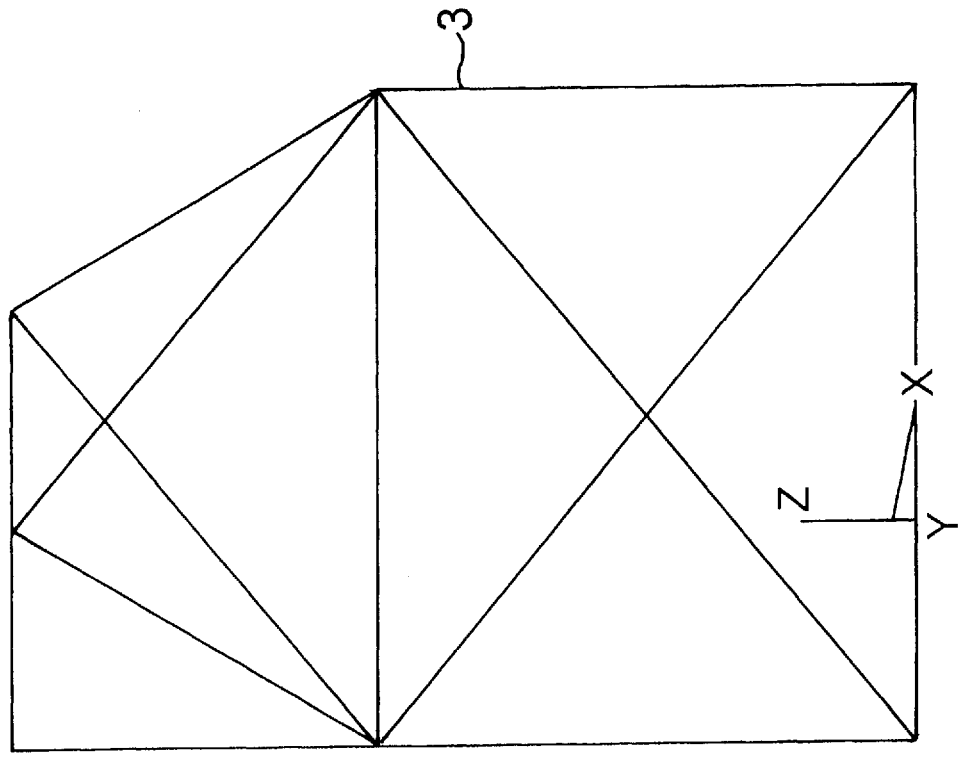
Figure 5C:
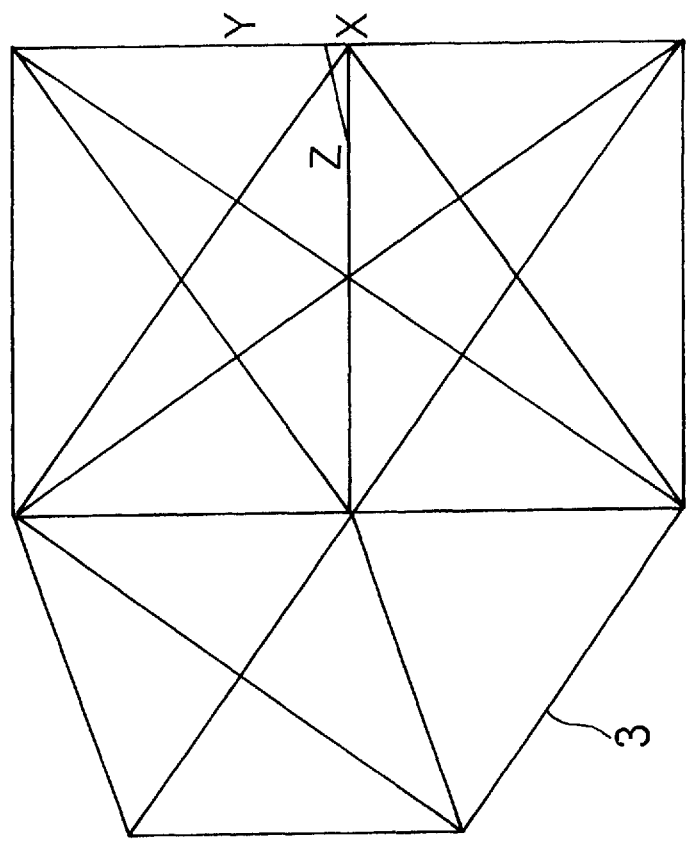
Figure 6A:
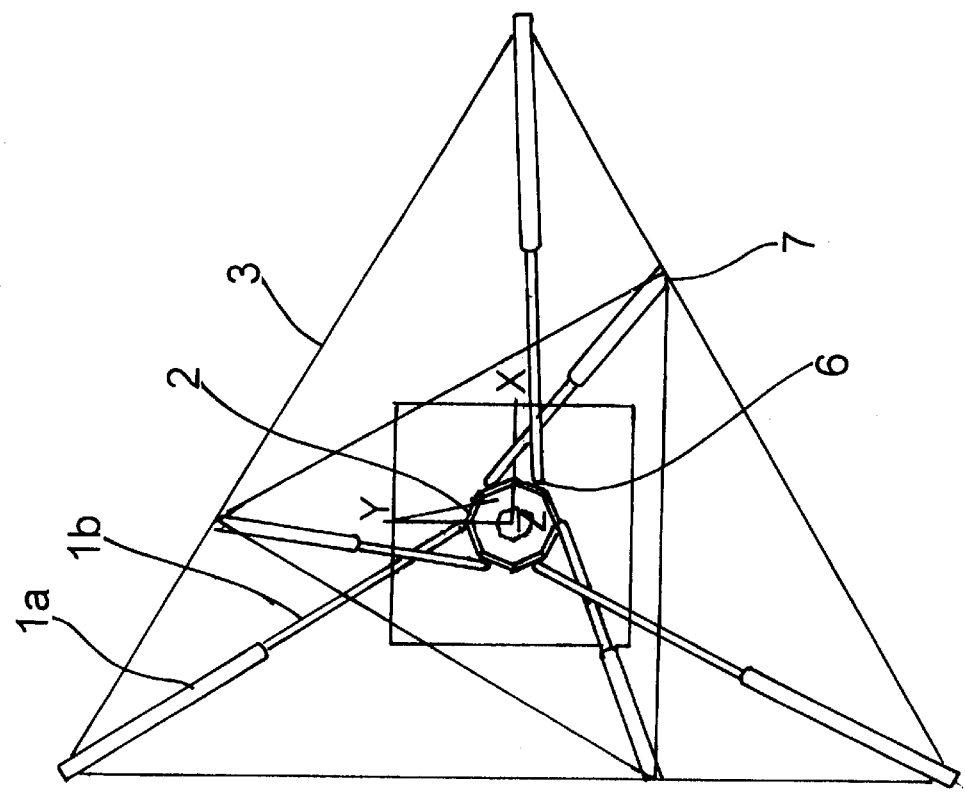
Figure 6B:
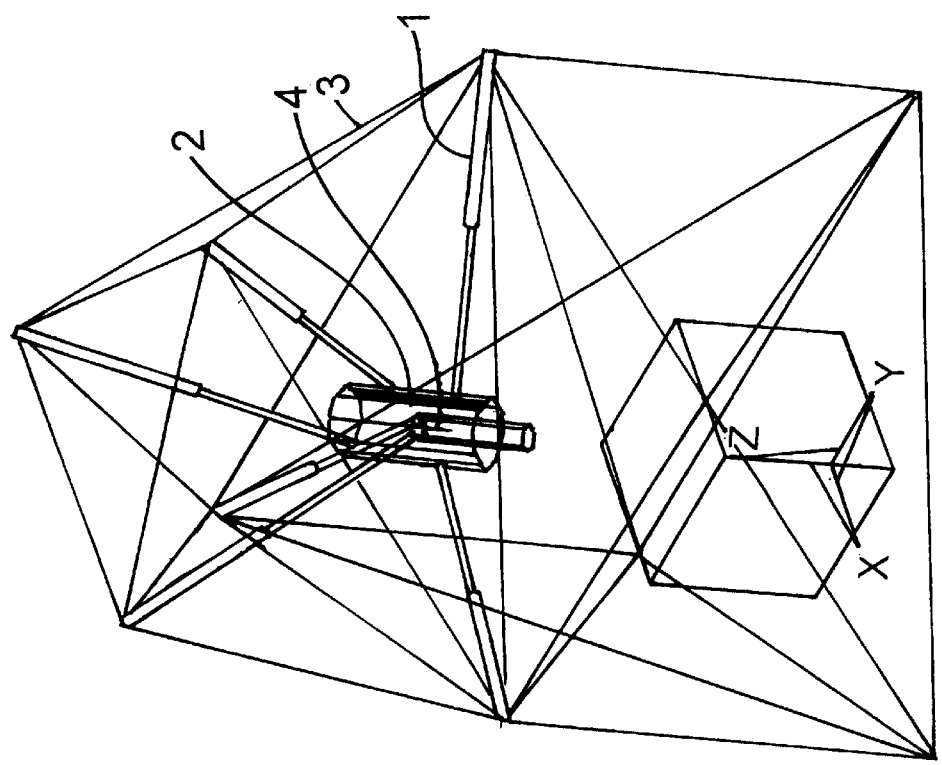
Figure 6D:
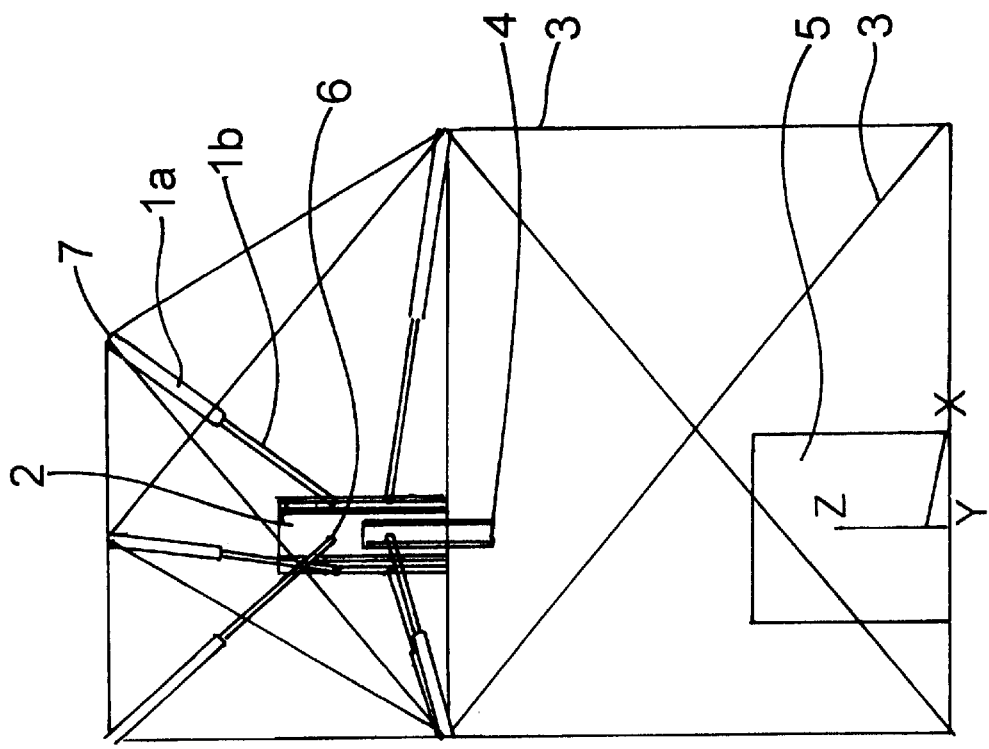
Figure 6C:
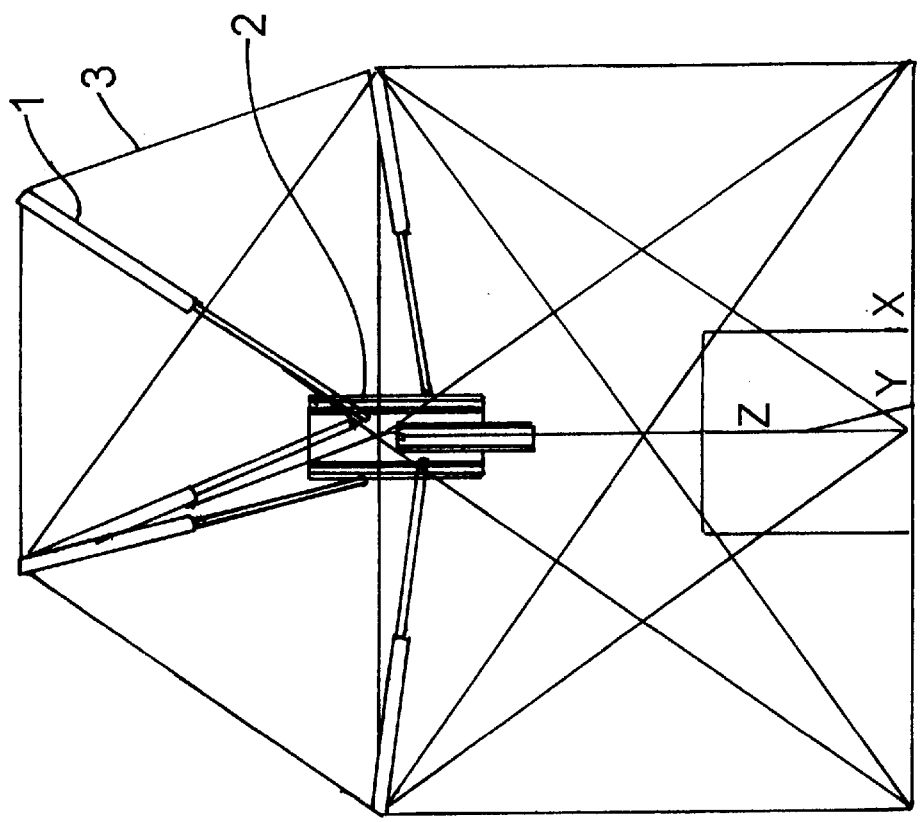
Figure 7A:
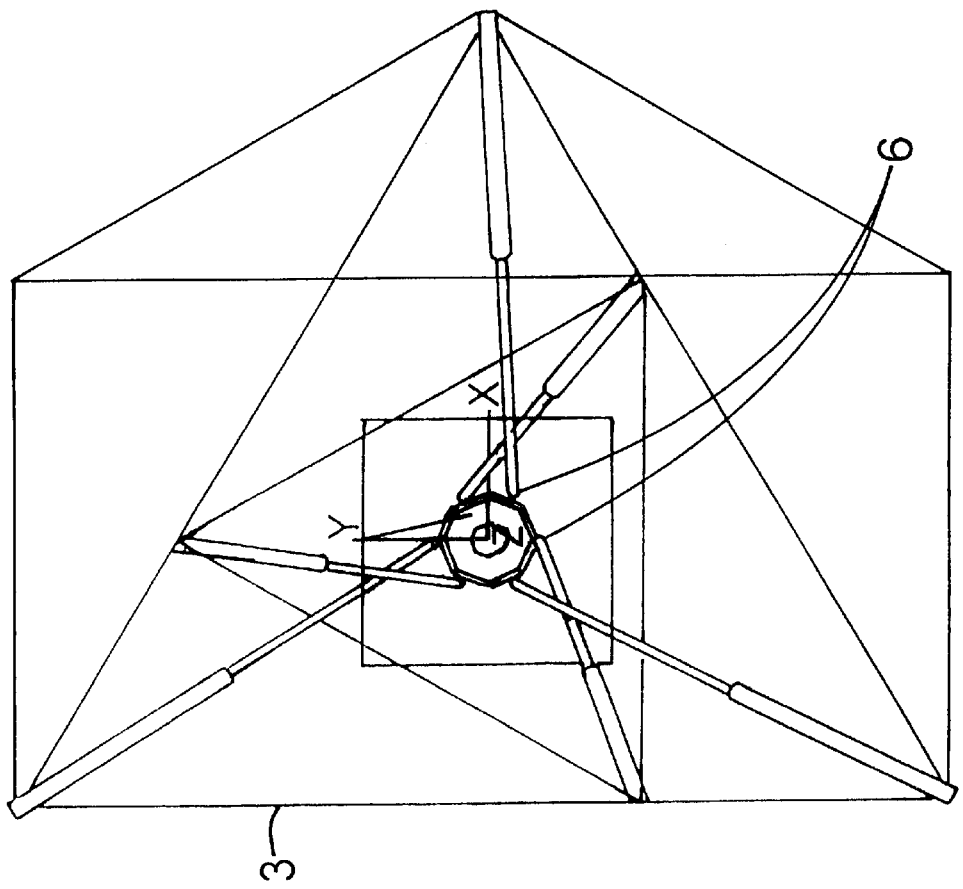
Figure 7B:
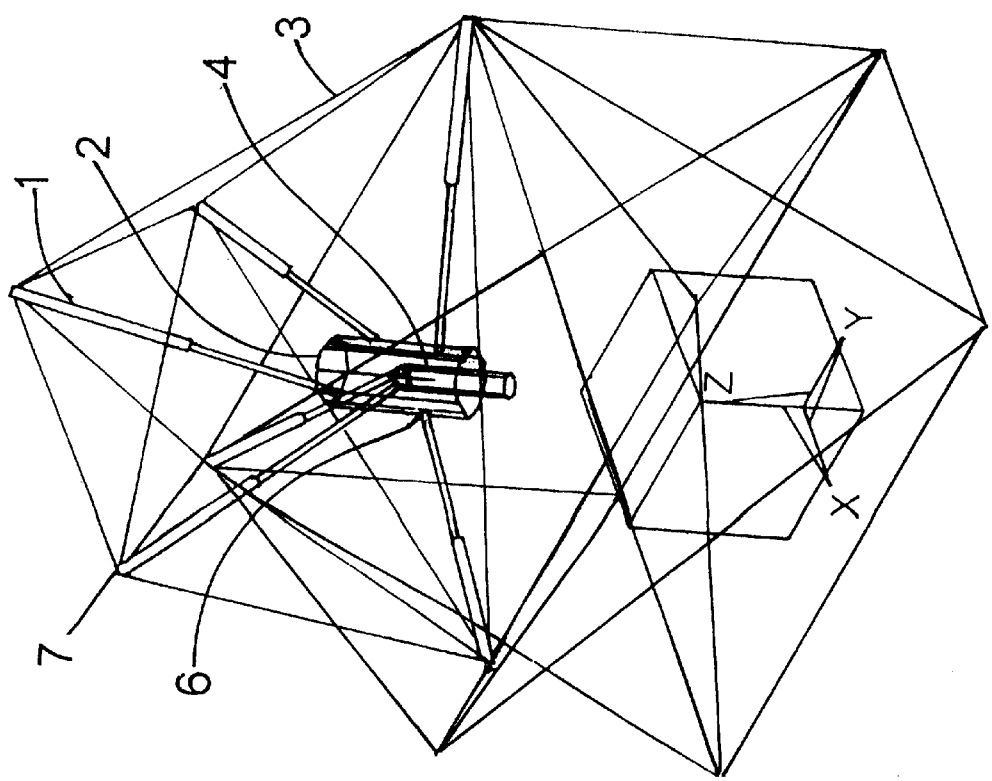
Figure 7D:
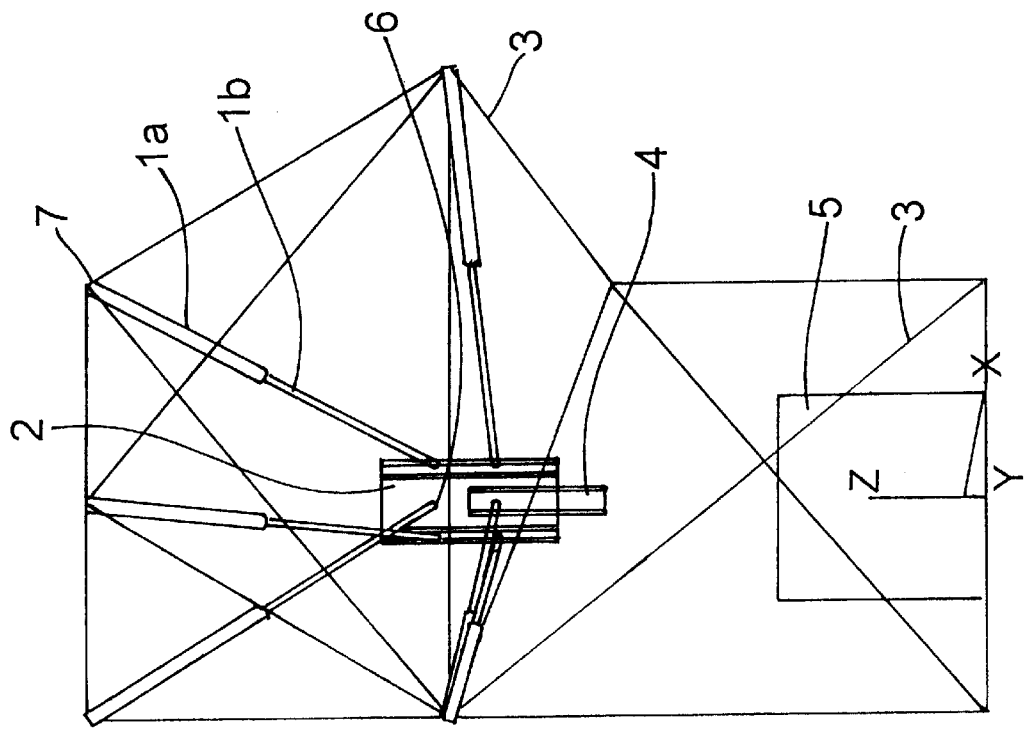
Figure 7C:
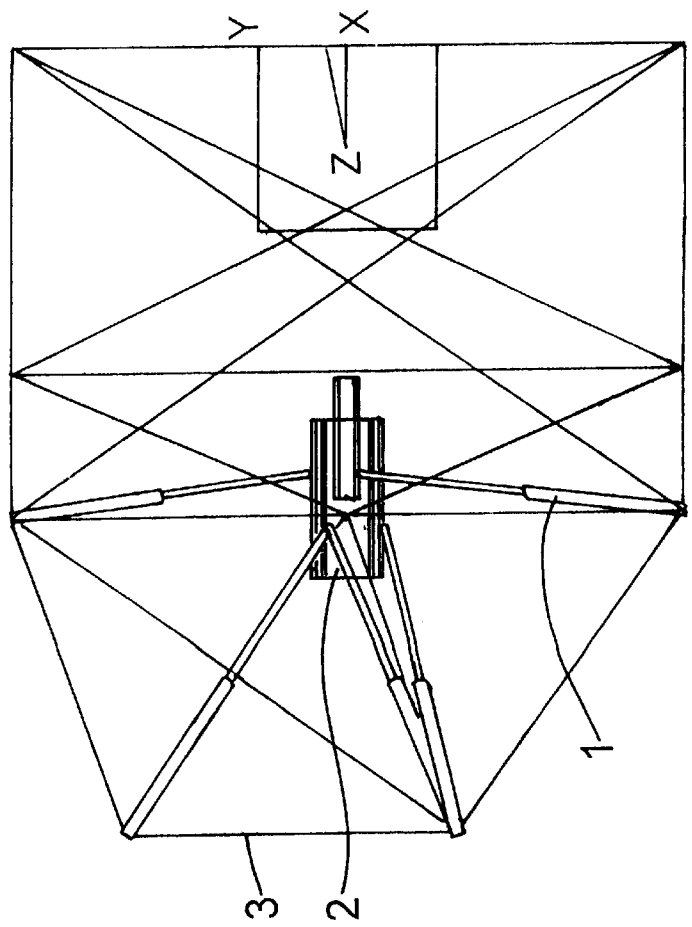

Alternatively to a triangular base area of the framework structure, it is also possible to provide a quadrangular base area, as can be seen in FIG. 4. The individual articulated points of the frame 3 are also connected to a foundation via the framework arrangement. In principle, parts of the frame can also be implemented conventionally in the form of a housing. A framework arrangement offers, however, the advantage of an optimum accessibility of the tool table 5 and of the machining space arranged in the interior of said framework arrangement. A representation showing only the framework structure for a machine tool having a triangular base area can be seen from FIG. 5.

FIGS. 6 and 7 show special embodiments of the machine tools which are shown more generally in FIGS. 3 and 4, said special embodiments concerning especially the structural design of the working platform 2. In FIGS. 6 and 7, said working platform 2 is essentially implemented as a cylindrical body carrying the main spindle 4 along the longitudinal axis thereof. The struts 1 are in this case articulated on the cylindrical working platform 2 in two parallel planes which are located one on top of the other and clearly spaced apart in the figure, the axis of the main spindle 4 extending at right angles to said planes.

The articulation points of the struts of the plane constituting the upper plane in the figure are, in turn, arranged in a common upper plane on the frame 3, whereas the frame articulation points of the struts of the lower plane are, in turn, arranged in a corresponding common plane on the frame 3. The inclination of the upper struts with regard to a plane that is normal to the main spindle axis is opposite to the inclination of the lower struts at a central position of rest of the working platform 2. For absorbing axial forces in the direction of the main spindle axis, the upper struts extend at a steeper angle than the lower struts which serve primarily as a radial support with regard to the main spindle axis. The less steep the lateral support means are, the more the working platform 2 can be pivoted about a horizontal axis in FIGS. 6 and 7. The steeper inclination of the upper struts in comparison with the lower struts is maintained when the working platform 2 is moved in the direction of the tool table 5. Starting from the respective joint on the support 2, the angle of the lower struts relative to the XY plane is preferably negative or 0° at the most.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A hexapodal machining center comprising a stationary frame (3) and a support (2), which are interconnected by six struts (1) of adjustable length, the support (2) having provided thereon six separate articulation points for the struts, wherein three first articulation points of three first struts (1) on the support (2) define a first plane of application located on a first side of the support (2) and three further articulation points of three further struts (1) on the support (2) define a second separate plane of application located on a second side of the support (2), the two planes of application being spaced from one another, wherein the articulation points of the three first struts (1) of the first plane of application on the support (2) define a first plane of application on the frame (3) and the articulation points of the three further struts of the second plane of application on the support (2) define a second separate plane of application on the frame (3), and wherein the first plane of application on the frame (3) lies on the first side of the support and said second plane of application on the frame lies on the second side of the support.

2. The hexapodal machining center according to claim 1, wherein the articulation points (6) of the struts (1) on the support (2) are arranged in the form of a three dimensional polyhedron.

3. The hexapodal machining center according to claim 2, wherein the three dimensional polyhedron is in the form of a cube having six faces, each of the six faces having provided thereon an articulation point (6) on the support (2).

4. The hexapodal machining center according to claim 3, wherein the articulation points (6) are arranged at respective face centers of said cube.

5. The hexapodal machining center according to claim 1, wherein the articulation points (6) of the struts (1) on the frame (3) are arranged in the form of a three-dimensional polyhedron with the articulation points (6) of the struts (1) on the frame (3) being located on a respective outer edge of the three-dimensional polyhedron.

6. The hexapodal machining center according to claim 5, wherein each of the articulation points (6) on the support (2) on opposed surfaces of said support (2) is connected via a respective strut (1) to an articulation point (7) on parallel outer edges of the frame (3).

7. The hexapodal machining center according to claim 1, wherein the frame (3) with the articulation points (7) for the struts (1) is implemented as a framework arrangement.

8. The hexapodal machining center according to claim 7, wherein the articulation points (7) are connected to a foundation via the framework arrangement.

9. The hexapodal machining center according to claim 1, wherein the frame (3) has a triangular base area.

10. The hexapodal machining center according to claim 1, wherein the frame (3) has a quadrangular base area.

11. The hexapodal machining center according to claim 1, wherein the support (2) is provided with a main spindle (4) whose longitudinal axis intersects the two planes of application of the articulation points of the support (2).

12. The hexapodal machining center according to claim 1, wherein the support (2) is provided with a main spindle (4) extending along a main diagonal of said support (2).

13. The hexapodal machining center according to claim 11, wherein at a position of rest of the support (2), the main spindle (4) is orientated parallel to a Z-axis of a work piece coordinate system.

14. The hexapodal machining center according to claim 1, wherein the struts (1) are arranged in the main-load direction of the support.

15. The hexapodal machining center according to claim 2, wherein the polyhedron is in the form of a cube.

16. The hexapodal machining center according to claim 1, wherein the articulation points (6) of the struts (1) on the support (2) are arranged in the form of a sphere.

17. The hexapodal machining center according to claim 5, wherein the three dimensional polyhedron is in the form of a cube.

18. The hexapodal machining center according to claim 1, wherein the articulation points (6) of the struts (1) on the frame (3) are arranged in the form of a sphere with the articulation points (6) of the struts (1) on the frame (3) being located on a respective outer edge of the sphere.

* * * * *